United States Patent Office 3,268,479
Patented August 23, 1966

3,268,479
NITROSO AND OXIME CONTAINING POLYMERS
Rock F. Martel, Erie, Pa., assignor to Lord Corporation,
a corporation of Pennsylvania
No Drawing. Filed Sept. 6, 1961, Ser. No. 136,169
13 Claims. (Cl. 260—59)

This invention relates to novel polymers, and more particularly provides novel nitrogen-containing polymers and methods of obtaining the same.

Nitroso-substituted aromatic compounds, particularly dinitrosobenzene, have found increasing use in recent years as additives for rubber-containing compositions. Thus dinitrosobenzene is used in heat treatment of butyl rubber by mixing it with the rubber and carbon black, and milling the mixture at an elevated temperature, such as about 400° F., to form an interacted product known as a carbon gel adapted for the introduction of other rubber stock components and vulcanization. Another application of dinitrosobenzene in rubber technology employs the nitroso compound in an additive composition comprising a halogenated elastomer as the film-forming constituent. The nitroso compound can accelerate bond formation with such adhesive formulations.

Dinitrosobenzene, however, is a difficult and dangerous material to handle, since it has hazardous explosive qualities. This not only affects its utilization unfavorably, but increases the cost of this nitroso compound, because of special precautions which must be taken in its manufacture and shipping.

Another disadvantage is that when dinitrosobenzene is used as an additive to adhesive compositions as above mentioned, while the time for bond formation is substantially less than that required in the absence of the nitroso compound, the acceleration of bond formation is achieved at the cost of a substantial decrease in the environmental resistance of the bond.

It is accordingly desired to find useful alternatives to dinitrosobenzene or like aromatic nitroso compounds, which can be used as elastomer adjuncts but which do not possess the disadvantages of this hazardous chemical.

Furthermore, dinitrosobenzene alone possesses no film forming properties, and must be utilized in conjunction with other polymeric materials to provide films such as adhesive films. Simplification of formulation of adhesives and like film-forming compositions could advantageously be achieved by eliminating one or the other of the film forming polymer and the nitroso compound, insofar as this could be achieved without sacrifice of the properties conferred on the adhesive by each of these separate components.

It is an object of this invention to provide novel nitrogen-containing polymers.

A particular object of this invention is to provide novel nitrogen-containing polymers including para-dinitrosobenzene nuclei in the polymer chain.

Another particular object of this invention is to provide novel polymers including para-dioximino benzene rings in the polymer chain and having advantageous adhesion promoting properties.

Another object is to provide novel compounds containing the para-dinitrosobenzene structure having diminished explosive qualities compared to monomeric compounds containing such structures.

Another object is to provide novel film forming products containing the dinitrosobenzene structure.

These and other objects will become evident from a consideration of the following specification and claims.

It has now been found that novolak resins can be converted to novel nitrogen-containing polymers which have unusual and advantageous properties, by methods comprising reacting the novolak with a nitrite to form a nitroso polymer and oximating quinone oxygen of said nitroso polymer to provide a quinone dioxime polymer; reacting said quinone dioxime polymer with nitric oxide and a base; and acidifying the resulting polymer.

The novel polymeric products provided by the stated methods are characterized by recurring para-substituted benzene nuclei linked by a methylene bridge wherein at least one of the para-positioned substituents is a nitrogenous group comprising a nitrogen atom bonded to the benzene nucleus and to an oxygen atom. In the various polymers provided hereby, the stated nitrogenous group is selected from the group consisting of NO, NOH, and

where M is a cation, as will further appear hereinafter.

The ultimate polymeric product is a polymer containing recurring nitrosobenzene units. Discovery has now been made that by substitution of this novel polymeric product for dinitrosobenzene in adhesive compositions containing halogenated elastomeric film-forming materials, it is possible to accelerate the time of formation of a tight bond between rubber and metal, without the sacrifice in environmental resistance of the bond which is the result of using monomeric para-dinitrosobenzene for accelerating bond formation. It has further been found that the polymeric quinone dioxime product of this invention is also a bonding time accelerator for adhesives containing halogenated elastomeric film-formers, and that this polymer also produces bonds having the high environmental resistance of the adhesive composition in the absence of a nitrogen-containing material. This is surprising, for monomeric compounds of this type are ordinarily ineffective as substitutes for dinitrosobenzene, even in the presence of oxidizing agents which might be expected to have the capacity for converting such oximes to the corresponding dinitroso compound. Several of the novel polymeric products of the invention, besides having utility as a dinitrosobenzene substitute as stated above or as an intermediate for making polymers with such utility, have film-forming properties. Thus the new products provided by this invention may be used for a wide variety of purposes, not only as an adjunct for rubber and other elastomers in applications like those for which monomeric nitrogen compounds may find use, but also in applications where they supply part or all of a film-forming component such as in adhesives. In combination with other polymeric materials, they may act as fillers as well as exerting effects of functional substituents. The present products, unlike monomeric dinitrosobenzene, are not sensitive to explosive decomposition, and therefore are susceptible of many uses for which dinitrosobenzene is unfitted.

Referring now to the practice of the invention, the starting materials employed in accordance herewith are the fusible, soluble, linear condensation products of a carbonyl compound with an aromatic compound selected from phenols free of para substituents. These novolak resins are well known in the art, as are methods of preparation of the same. Generally, an acid is the catalyst for phenol condensation. For use in accordance with this invention, the resin should be a novolak and not a resol. Many patents (see, for example, Ellis, Chemistry of Synthetic Resins) describe preparation of the fusible phenol-formaldehyde and like novolak resins.

The most preferred starting materials are the fusible, soluble, acid-catalyzed condensation products of a phenol and a carbonyl compound, particularly an aldehyde, having a general structure of methylene radicals connecting o-phenol radicals.

The novolak resins useful for the present purposes are those comprising a significant proportion of methylene linked substituted-phenyl units wherein one of the ortho and para positions of each phenyl nucleus is substituted by H. As is well known in the art, the methylene units of the novolak chains connect the substituted-phenyl units at positions selected from the ortho and para positions. The presently useful novolaks are represented generally by the ideal formula

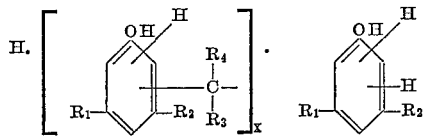

where $x$ is an integer, $R_1$, $R_2$, $R_3$ and $R_4$ are selected from the group consisting of H and R, and R is selected from the group consisting of hydrocarbon and hydrocarbon ether radicals. The substituents shown as on the phenyl nucleus are each attached to one of the open substituent positions on the phenyl nucleus. The value of $x$ will be at least 1. Novolaks have relatively low molecular weights, and usually the mixture of polymers in these resins will not contain a significant amount of polymer wherein $x$ has a value above 15. Preferably the average value of $x$ will be in the lower end of the range of from 1 to 15.

As shown in the formula above, either the ortho or the para position of each substituted-phenyl nucleus may carry the H substituent, while the methylene bridges are attached to the other of the stated positions. An ortho H atom can be replaced by a nitrogenous radical in accordance with the present process, but it is preferred to practice the invention on novolak resins wherein the position para to the phenyl substituent group is occupied by H. In these resins, the methylene bridges can be located ortho to the phenyl substituent in each of the phenyl nuclei to which they are attached, or they can be located ortho to this group in one of these phenyl nuclei, and para to it in the other. The former type are designated as 2,2'-phenylmethylene units, and the latter, as 2,4'-phenylmethylene units. For the present purposes, it is preferred that of the di(substituted phenyl)methane units in the polymer, at least about 20% out of each hundred such units should be 2,2'-phenylmethylene units.

In the novolak resins, the substituents $R_1$ and $R_2$ on the phenyl nuclei are most preferably each H, that is, the phenolic novolaks are preferably made from phenol itself. If desired, one or both of $R_1$ and $R_2$ may be hydrocarbon. Since the alkyl substituents of m-alkylphenols from which these resins will be made are usually lower alkyl, preferred novolaks are those containing m-cresol, 3,5-xylenol, m-ethylphenol, 3-methylphenol, 3-methyl-5-ethylphenol and like m-lower-alkylphenol nuclei, where the lower alkyl radical contains from 1 to 6 carbon atoms. If desired, $R_1$ and $R_2$ may be selected from H, hydrocarbon, and hydrocarbon ether radicals containing up to 18 carbon atoms including aliphatic (saturated and unsaturated, alicyclic and straight or branched chain) and aromatic (alkaryl and aralkyl) radicals. By hydrocarbon ether is meant a hydrocarbon chain interrupted by an ether oxygen atom linking two carbon atoms. Thus the novolak may contain the nuclei of m-hydrocarbylphenols such as m-alkylphenol and m,m-dialkylphenol where alkyl is a long chain derived from tallow, kerosene, coconut fatty acids and similar commercial sources, or is isoctyl, dodecyl, hexadecyl, cyclohexyl and so forth; such as m-allylphenol, m,m'-diallylphenol, m-dodecenylphenol, m-propargylphenol, and so forth; and such as m-phenylphenol, m,m'-dibenzylphenol, m-(o-tolyl)phenol, m-methoxyphenol and the like.

Referring to the substituents $R_3$ and $R_4$ on the methylene bridges, those are again preferably each H, as provided where the novolak is prepared from formaldehyde or like reagents such as paraformaldehyde, hexamethylenetetramine, and so forth. This provides a linking bridge unit which is the methylene radical itself, of the formula —$CH_2$—. In these novolak polymers and in the novel products provided therefrom by this invention, the bridging units wherein a single carbon atom connects adjacent benzene nuclei are referred to herein as methylene radicals in the generic sense, as inclusive of substituted methylene radicals, wherein the substituents are not limited to H, except where the context indicates otherwise. The stated substituents may alternatively be hydrocarbon or hydrocarbon ether, in which case they can conform to any of such radicals included within the above-stated general description of such radicals which $R_1$ and $R_2$ may represent. Where the novolak is prepared from an aldehyde, $R_3$ is H and $R_4$ is a hydrocarbon or hydrocarbon ether radical, illustrative of which are methyl, ethyl, propyl, isopropyl, phenyl, vinyl, 2-phenylvinyl, 1-propenyl, 1-methyl-1-propenyl, furyl and so forth. Ketones are also used to prepare novolaks, in which case each of $R_3$ and $R_4$ may be hydrocarbon or hydrocarbon ether, providing methylene bridges such as isopropylidene, cyclohexylidene, methylcyclohexylidene, isobutylidene, sym-di-(isopropylidene) isopropylidene radicals and so forth.

Each of the several mentioned variations on $R_1$ and $R_2$ can be combined with each of those on $R_3$ and $R_4$: Thus, the novolaks may be prepared from m-cresol and acrolein, from 2,5-xylenol and acetone, and so forth. The novolaks including olefinic substituents and their products as provided hereby can be subjected to vinyl-type copolymerization.

In the practice of the method of the invention, the novolak resin will be treated with a nitrite to introduce a nitroso radical into a position conjugated with the functional group of the phenyl nucleus in the resin, generally the para position. Since at least a moiety of the phenyl nuclei in the novolaks will contain a free para position, hereinafter reference will be made to the stated conjugated position as the para position, which is to be understood as including the ortho position insofar as this is the position open for reaction instead of the para position. In one preferred procedure for the nitrosation, the nitrite employed will be an organic nitrite, generally an alkyl nitrite, such as, for example, isopropyl nitrite, butyl nitrite, methyl nitrite, isohexyl nitrite and so forth. Where an organic nitrite is employed for the nitrosation, the reaction may be carried out in an organic solvent. Exemplary of useful solvents are polar organic solvents such as methanol, isopropanol and so forth. Instead of employing an organic nitrite, the invention may be practiced using an inorganic nitrite, such as sodium nitrite or another metal nitrite, preferably an alkali metal nitrite such as lithium or potassium nitrite or other water soluble nitrites, in aqueous solution, in the presence of an acid. The acid may be any inorganic acid; generally hydrochloric acid is conveniently used, but, for example, sulfuric acid could be employed instead. The amount of nitrite with which the novolak is treated may vary. Even incomplete nitrosation, not affecting all the phenyl nuclei present, produces significant alteration of the polymer nature, using as little as ⅕ gram mole of the nitrite per mole of phenyl nuclei in the novolak polymer. If desired, in excess of 1 mole of nitrite, up to 2 to 4 moles per mole of phenyl nuclei in the novolak, may be employed. The nitrosation will generally be an exothermic reaction and occur without introducton of heat to the reaction mixture, which may be cooled or if desired heated, to a temperature below the decomposition temperature of the reactants. Ambient pressures are generally effective, although if desired sub- or super-atmospheric pressures may be used. Generally the nitrite will be added gradually to a solution of the resin. As the reaction progresses, the reaction mixture will generally darken, due to the color change from the novolak resin to the nitroso substituted novolak resin, and in concentrated solution, the polymeric nitrosated product may separate out and precipitate.

The produce is a novel polymer characterized by recurring p-nitroso-substituted-phenyl units which are tautomeric isomers of the corresponding oxime units as represented generally by the formula

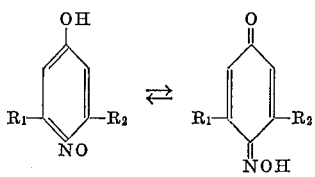

linked by an o-methylene bridge of the formula

where $R_1$, $R_2$, $R_3$ and $R_4$ are as defined above.

Where the stated nitrosation procedure is conducted on the phenolic novolak resins which are the preferred starting materials for the practice of the invention, the product is a nitrosophenol polymer which is further reacted, as set forth hereinafter, to convert it to a quinone dioxime polymer. The products which are the polymeric products of this step of the invention may be retained in solution for subsequent reaction as described hereinafter, or may be isolated by usual techniques such as evaporation of solvent to effect precipitation.

The products provided hereby as the stated nitrosophenol polymers herein may and preferably will contain recurring units which are the nitrosophenol unit itself linked by an o-methylene bridge and especially preferably the p-nitrosophenol unit of the formula

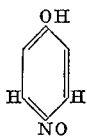

linked by o-methylene bridges of the formula —$CH_2$—. Also provided hereby are nitrosophenol polymers characterized, for example by recurring m-methyl-p-nitrosophenol units linked by an o-methylene bridge;

by recurring m,m'-dimethyl-p-nitrosophenol units linked by an o-methylene bridge;

by recurring p-nitrosophenol units linked by an o-ethylidene bridge;

by recurring p-nitrosophenol units linked by an o-isopropylidene bridge;

by recurring p-nitrosophenol units linked by an o-propylidene bridge;

by recurring p-nitrosophenol units linked by an o-benzylidene bridge;

by recurring m-ethyl-p-nitrosophenol units linked by an o-cyclohexylidene bridge;

by recurring p-nitrosophenol units linked by an o-allylidene bridge;

by recurring m-allyl-p-nitrosophenol units linked by an o-methylene bridge;

by recurring m-$C_{18}H_{37}$-p-nitrosophenol units linked by an o-methylene bridge, and so forth.

The nitroso-substituted polymers made from the novolak resins derived from phenols are tautomeric with the corresponding quinone monoximes, containing quinone oxygen. In accordance with this invention, quinone oxygen in polymers as herein provided must be oximated to provide the quinone dioxime polymers of this invention.

The conversion of these nitrosophenol polymers to the novel products characterized as quinone dioxime polymers is accomplished by reacting the nitrosophenol polymers prepared as described above with hydroxylamine. Usually the hydroxylamine will be obtained and will be used as the hydrochloride, but other acid salts such as the sulfate may be used instead, or free hydroxylamine may be used. The reaction of the hydroxylamine with the nitrosophenol polymer is preferably conducted in an organic solvent, and to obtain solution of the polymer, polar organic solvents such as methanol, ethanol, isopropanol and the like are preferred. The reaction medium may also be or include water, and may consist, for example, of a mixture of an alcoholic solvent and water. The amount of hydroxylamine to be added to the nitrosophenol polymer should provide at least approximately a molar equivalent per mole of nitrosophenol units in the amount of polymer employed; the extent of nitrosation of the initial novolak will determine what this value is. A metal salt of a weak acid, preferably an alkali metal salt of a low molecular weight organic acid such as sodium acetate, or of an inorganic acid such as sodium phosphate, is conveniently added to the reaction mixture as a buffer reagent. The conditions of reaction are conveniently ambient temperature and pressure, although if desired the temperature may be lowered below room temperature to moderate the reaction, or raised to an elevated temperature, such as the reflux temperature of the reaction mixture, below the decomposition temperature of the reaction mixture components, and the pressure may be sub-atmospheric or super-atmospheric if any advantage is to be gained thereby. The product of the reaction, the dioxime polymer, may be recovered by usual manipulatory techniques such as concentration of the reaction mixture, precipitation of the organic product from the organic reaction medium by addition of water thereto and so forth. The product of this treatment is a polymeric quinone dioxime having recurring units of the formula (representing the para-quinone)

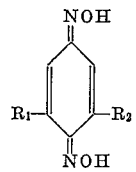

linked by

bridges, where $R_1$, $R_2$, $R_3$ and $R_4$ are as defined hereinabove. Thus for example, the recurring units of the formula illustrated above may be p-benzoquinone dioxime units linked by an o-methylene bridge;

m-methyl-p-benzoquinone dioxime units linked by an o-methylene bridge;

m,m'-dimethyl-p-benzoquinone dioxine units linked by an o-methylene bridge;

p-benzoquinone dioxime units linked by an o-isopropylidene bridge;

p-benzoquinone dioxime units linked by an o-ethylidene bridge;

p-benzoquinone dioxime units linked by an o-benzylidene bridge;

m'-isopropyl-p-benzoquinone dioxime units linked by an o-ethylidene bridge and so forth.

The quinone dioxime polymers provided by the present invention as above described are unexpectedly useful as illustrated hereinafter, as bond formation accelerators in adhesive compositions comprising halogenated elastomers. They may also be used as fillers and modifiers for rubbers and other elastomers, such as the urethane polymers for example. From basic solution, they form films.

Referring now to the preparation of the further novel polymers of this invention, the polymeric quinone dioximes prepared as stated above are added to a solution of a base. The base may be any of a wide variety of organic or inorganic basic compounds. Where the reaction is conducted in an organic reaction medium, for example, the base may be an organic derivative of an alkali metal, such as an alkali metal alkoxide like sodium methoxide, lithium methoxide, potassium methoxide, sodium ethoxide and so forth. It may also be an organic base such as an amine, such as triethylamine, di-n-propylamine, piperidine, piperazine, and so forth. Where the reaction is conducted in an aqueous solution, it is preferred to use bases which are water soluble, such as sodium hydroxide, lithium hydroxide and so forth. The combination of the quinone dioxime polymer and the base will be made in a solvent, and in this connection the solvent may be water, as mentioned, or it may be an organic solvent, such as, for example, a non-polar solvent such as benzene or heptane, or a polar solvent like methanol. Ethers such as diethyl ether and similar oxy compounds such as dioxane may alternatively be employed, as well as dimethyl formamide, and chlorinated compounds such as carbon tetrachloride, ethylene dichloride and so forth.

The reaction mixture comprising the base and the quinone dioxime polymer will be reacted with nitric oxide. In order for the reaction of the nitric oxide with the oxime to proceed, it is essential that it be carried out in an oxygen-free atmosphere; and to accomplish this, the reaction mixture comprising the polymer and base in a solvent will be placed in a gas-tight container such as an autoclave and the system purged of air, as by flushing with an inert gas such as nitrogen. Nitric oxide can then be introduced into the reaction mixture. Usually undiluted nitric oxide gas will be employed, but where desired it may be admixed with inert gaseous diluents such as nitrogen or the like.

Referring to proportions, the number of moles of nitric oxide required is two moles per mole of quinone dioxime units in the polymer. In the reaction each of the nitrogen atoms takes on a nitroso substituent group. Generally it is advantageous to introduce the nitric oxide in excess of the calculated equivalent. Very large excesses, up to 10 or 20 times the calculated amount of this reagent may be employed if desired. The amount of base taken up in the reaction is one mole per mole of oxime groups in the polymer, and in this connection it is only the oxime groups which take up base. However, to provide a solution in which the nitroso polymer will exist primarily in the tautomeric oxime form of polymer susceptible to the present reaction, excess base above an equivalent to the oxime groups will be used. Accordingly, the proportion of base employed relative to polymer should also be at least about two equivalents per mole of quinone oxime units in the polymer. An equivalent is one mole of base where the cation is monofunctional, such as sodium methoxide, one-half mole when the cation is difunctional, and so forth. The base may also be present in excess of the stated amount, such as an excess of from two to ten times the stated amount.

The conversion of the dioxime polymer to the novel polymer products produced by reaction with the nitric oxide and base can be conducted at atmospheric, subatmospheric or super-atmospheric pressure. Pressures as low as 400 millimeters of mercury may be employed, and any pressure above this can be utilized. Since nitric oxide is a gas, here it will ordinarily be convenient to operate at super-atmospheric pressure. The progress of the conversion of the dioxime polymer to the novel polymeric product of the N-nitrosohydroxylamine salt type can be followed by observing the decrease in pressure as the nitric oxide is consumed in the reaction: when the pressure no longer decreases, but remains constant, conversion of the reaction mixture will be substantially complete. Generally pressures in the range of from about 1 to about 30 atmospheres will be found advantageous when an ordinary chemical autoclave is used. When desired however, much higher pressures, such as up to about 1,000 pounds per sq. in. or more can be utilized.

Generally moderate temperatures are quite sufficient, and ambient temperatures or the temperatures developed by exotherm are suitable to effect the reaction. Indeed, where the dioxime polymer reacts exothermically under the conditions stated, cooling may be required to moderate the rate of the reaction. Thus temperatures below 0° C. may sometimes be used. Where the polymer is particularly unreactive, heating may be employed if desired, and in such case the temperature may range as high as necessary to produce the desired rate of reaction so long as it is maintained below the decomposition temperature of the reactant. Generally temperatures above 100° C. are unnecessary.

On completion of the reaction, the novel polymer products may be isolated by usual procedures such as precipitation of the polymer by addition of an incompatible organic solvent to the reaction mixture.

The products are N-nitrosohydroxylamine polymers comprising recurring N,N'-dinitroso-N,N'-dihydroxyl-p-phenylenediamine salt units linked by an o-methylene bridge. The products are characterized, that is, by recurring units of the formula

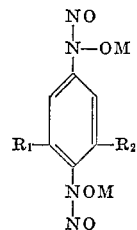

linked by an

bridge where $R_1$, $R_2$, $R_3$ and $R_4$ as defined hereinabove, and M is the cation of the base employed. When the initial polymer is a phenolic novolak, product contains recurring p-phenylene-N,N'-dinitrosodihydroxylamine di salt units linked by an o-methylene bridge. Thus the polymer chain may comprise recurring p-phenylene-N,N'-dinitrosodihydroxylamine disodium salt units linked by an o-methylene bridge;

recurring m-methyl-p-phenylene-N,N'-dinitrosodihydroxylamine disodium salt units links by an o-methylene bridge;

recurring m,m' - dimethyl-p-phenylene-N,N'-dinitrosodihydroxylamine disodium salt units linked by an o-methylene bridge;

recurring m-isopropyl-m'-methyl-p-phenylene-N,N'-dinitrosodihydroxylamine dipotassium salt units linked by an o-methylene bridge;

recurring m,m' - diethyl-p-phenylene-N,N'-dinitrosodihydroxylamine disodium salt units linked by an o-methylene bridge;

recurring p-phenylene-N,N'-dinitrosodihydroxylamine dipiperidine salt units linked to an o-furfurylidene bridge;

recurring p-phenylene-N,N'-dinitrosodihydroxylamine dilithium salt units linked by an o-isopropylidene bridge;

recurring p-phenylene-N,N'-dinitrosodihydroxylamine disodium salt units linked by an o-benzylidene bridge;

recurring m-methyl-p-phenylene-N,N'-dinitrosodihydroxylamine disodium salt units linked by an o-ethylidene bridge and so forth.

The salts which are formed as products of the present method can readily be subjected to metathesis with another salt to convert them into salts of different cations, so that in addition to the salts provided directly by this invention, such as the sodium salt of the stated polymers or other alkali metal salts or salts with amines such as piperidine and so forth, the salts with any other desired metal such as salts of titanium, vanadium, chromium, manganese, iron, cobalt, nickel, copper, zinc, silver and the like can be prepared.

For conversion of the N-nitrosohydroxylamine polymers prepared as stated to the ultimate polymeric products of this invention, the polymer containing the N-nitrosohydroxylamine salt groups need merely be acidified. The acid used for this purpose may be an inorganic acid such as hydrochloric acid, sulfuric acid, and so forth, or may be an organic acid such as acetic acid, benzoic acid, oxalic acid, salicylic acid or the like. Concentrated hydrochloric is suitable. Oxides of nitrogen are evolved and the reaction is exothermic, and accordingly, it is usually convenient to conduct the reaction simply by mixing acid with a solution of the nitrosohydroxylamine salt polymer, gradually, until evolution of the oxides of nitrogen ceases. On completion of the evolution of the oxides of nitrogen, there is obtained a polymer containing nitrosobenzene nuclei, with recurring units of the structure

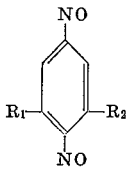

linked by an

bridge, where $R_1$, $R_2$, $R_3$ and $R$ are as hereinabove described. Particularly preferred products as provided by this invention are such polymers comprising recurring p-dinitrosobenzene nuclei units with linking methylene radicals in the 2-position. Thus for example, illustrative of the novel polymers obtained by the stated reaction are polymers containing recurring p-dinitrosobenzene units, of the formula

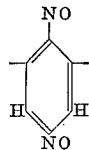

linked by a —$CH_2$— bridge, and polymers characterized by recurring p-dinitrosobenzene units linked by a -2-ethylidene bridge;
recurring p-dinitrosobenzene units linked by a -2-isopropylidene bridge;
recurring p-dinitrosobenzene units linked by a -2-propylidene bridge;
recurring p-dinitrosobenzene units linked by a -2-benzylidene bridge;
recurring p-dinitrosobenzene units linked by a -2-vinylidene bridge;
recurring p-dinitrosobenzene units linked by a -2-(2-phenyl)vinylidene bridge;
recurring m-methyl-p-dinitrosobenzene units linked by a -2-methylene bridge;
recurring m,m'-dimethyl-p-dinitrosobenzene units linked by a -2-methylene bridge;
recurring m-ethyl-m-methyl-p-dinitrosobenzene units linked by a -2-methylene bridge;
recurring m-allyl-p-dinitrosobenzene units linked by a -2-methylene bridge;
recurring m-vinyl-p-dinitrosobenzene units linked by a -2-ethylidene bridge;
recurring m-dodecyl-p-dinitrosobenzene units linked by a -2-methylene bridge;
recurring m-benzyl-p-dinitrosobenzene units linked by a -2-methylene bridge;

and so forth. These polymers are useful as bond formation accelerators in adhesive compositions comprising halogenated elastomers, and may also be used as fillers and modifiers for rubber and other elastomers.

The products of the present invention which are quinone dioxime polymers and nitrosobenzene polymers, as stated, may be used to accelerate the bonding time of adhesive compositions, without sacrifice of the extreme environmental resistance properties of the bond. The adhesive compositions exhibiting this unexpectedly advantageous effect consist essentially, as organic constituents, of a chlorinated natural rubber containing a chlorine content of from about 50 to about 70 weight-percent, preferably about 65 to 67 weight-percent; an after-brominated poly-2,3-dichlorobutadiene-1,3 containing a bromine content of from 7.5 to 42 mole percent, preferably 15 to 36 mole percent; and the novel polymers of this invention. In the mixture, the stated novel polymers of this invention will be effective in amounts as low as about 1% by weight based on the weight of the solids in the composition. Amounts of the stated polymers greatly in excess of that amount, even as high as 40–50%, may be employed. The chlorinated rubber and the brominated polydichlorobutadiene may each also be present in from relatively low levels such as about 50%, ranging to amounts as high as about 94%, based on the weight of the solids in the mixture.

The application of the stated organic components in the form of a solution of at least one of them is preferred. In this connection it is generally preferred that the chlorinated natural rubber and brominated polychlorobutadiene be in solution. As solvent there may be employed any organic liquid or mixtures thereof in which one or more of the ingredients to be applied is soluble, to the extent dictated by the viscosity of the solution and the means of application to be employed. Generally the solids content of such a solution may range from as low as about 5% to as high as about 40%, although in most cases the solids content will range between about 10% and about 25%. Any solvent employed should also be readily volatile so that lengthy drying periods are not encountered. The preferred solvents especially for the preferred compositions discussed hereinafter are aromatic hydrocarbons such as benzene, toluene, xylene and the like, and the chlorinated aromatic hydrocarbons such as monochlorobenzene, dichlorobenzene and the like. Small amounts of aliphatic hydrocarbons, chloroaliphatic hydrocarbons, ketones, ethers and/or alcohols may be included if desired.

In addition to the above-mentioned organic constituents, in the adhesive compositions having extremely high environmental resistance as provided hereby, there will be included inorganics comprising basic oxides such as zinc oxide, magnesium oxide or the like, and carbon black. The inorganic oxide may be present in amounts ranging from about 1% to about 15%, and the carbon black, from about 2% to about 40%, by weight of solids in the reaction mixture. The rubber which may be bonded to metal in accordance with the present invention may be selected from any of the natural rubbers and olefinic synthetic rubbers including polybutadiene, neoprene (including polychloroprene), butyl rubber, brominated butyl rubber and the like. The metals to which the rubber may be bonded may also be selected from any of the common structural metals such as iron, steel (including stainless steel), lead, aluminum, copper, brass, Monel metal, nickel, zinc and the like. The adhesive composition will be applied to one or both of the surfaces to be bonded, and the solvent, if any, let volatilize. Then the rubber surface and the metal surface which are to be bonded will be brought together and this assembly heated under pressure to cause vulcanization of the rubber stock and bonding. As is well known in the art, the exact time and temperature of curing will vary depending on the nature of the body employed as well as on the nature of the ingredients in the adhesive phase. In general, however, the temperature during curing will be between about 270° F. and about 400° F. and the curing time will range from about 5 to about 60 minutes. The bond produced will have extraordinarily pronounced environmental resistance, as will appear from the examples set forth hereinafter.

The invention is illustrated but not limited by the following examples.

*Example I*

This example describes preparation of a nitrosophenol polymer.

Forty grams of a novolak resin prepared from phenol and formaldehyde, which contains approximately 65% bis(hydroxylphenyl)methane units and in which 75% of the units are 2,2'-phenolmethylene units, is dissolved in 100 ml. of methanol and the solution is cooled in an ice bath. Then 20 g. of isoamyl nitrite are added to the reaction mixture, which darkens during the addition. On standing overnight at room temperature, the nitroso-substituted polymer separates as a precipitate. Whereas the starting material, the novolak resin, is a viscous liquid which solidifies at about 60° F., the polymer produced by reaction with the organic nitrite is a high melting solid, having a melting point about 500° F. Sodium fusion of the polymer shows a positive nitrogen test (Prussian Blue). The infrared spectrum of the polymer is identical with that of an authentic sample of p-nitrosophenol, corroborating the postulated structure as a polymer characterized by recurring structural units of the formula

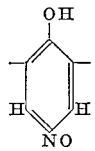

linked by a —CH$_2$— bridge.

*Example II*

The procedure of Example I is repeated but using only 6.0 g. of isoamyl nitrite. Again the reaction mixture darkens, and the solution contains a polymer having recurring p-nitrosophenol units linked by an o-methylene bridge as described in Example I.

*Example III*

This example describes preparation of a quinone dioxime polymer.

The methanolic solution of the p-nitrosophenol polymer prepared as described in Example II is mixed with an aqueous solution of 3.5 g. of hydroxylamine hydrochloride (0.05 mole) and 0.1 mole of sodium acetate. The resulting mixture is allowed to stand at room temperature for two days and then the reaction mixture is poured with stirring into 200 ml. of water. The precipitate of polymer which forms is extracted with chloroform and the chloroform solution of the polymer is dried over sodium sulfate. After filtration, the solvent is allowed to evaporate overnight. The product is a brown polymer characterized by recurring o-methylene-p-benzoquinone dioxime structural units of the formula

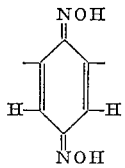

linked by a —CH$_2$— bridge.

*Example IV*

This example describes preparation of a polymer having recurring N-nitrosohydroxylamine salt groups on benzene nuclei.

The polymeric dioxime prepared as described in Example III is dissolved in 100 ml. of methanol to which is added 0.1 mole of sodium methoxide. The solution is cooled and placed in a pressure reaction vessel, which is flushed out with nitrogen to remove oxygen. The reaction mixture is then pressured with 60 p.s.i. of nitric oxide, whereupon 11 lbs. pressure of nitric oxide are absorbed. The unabsorbed nitric oxide is flushed from the reaction vessel, and the reaction mixture is then allowed to evaporate at room temperature to concentrate it. There remains 30–35 g. of a polymer characterized by the recurring structural unit

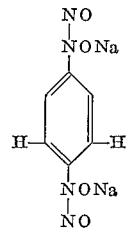

linked by a —CH$_2$— bridge. This polymer will form a film upon being cast from methanol; the film is clear with a greenish tinge and exhibits some adherence. On treating a solution of the polymer with zinc acetate, it is converted to the corresponding zinc salt.

*Example V*

A sample of the disodium salt polymer obtained as product in Example IV is dissolved in glacial acetic acid and warmed gently. Oxides of nitrogen are evolved, and there is obtained a solution of a polymer characterized by a recurring structural unit including a p-dinitrosobenzene nucleus, of the formula:

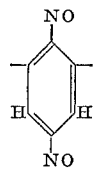

linked by a —CH$_2$— bridge.

Proceeding through a series of reactions as described in Examples II–V, but starting with a novolak prepared from phenol and furfural, the ultimate product is a polymer having recurring structural units which consist of p-dinitrosobenzene nuclei linked in the ortho position to a furfurylidene bridge, and the intermediate polymers contain corresponding substituents. These intermediate and utimate polymers have properties similar to those of the above-described polymers prepared from a phenol-formaldehyde novolak.

Employing acrolein and phenol, polymers containing vinylic unsaturation can be produced by procedures as described above; the polymer obtained from the novolak made from these materials has recurring p-dinitrosobenzene nuclei linked in the ortho position to allylidene bridges, and can undergo vinyl polymerization and copolymerization.

*Example VI*

In another series of reactions, 277 g. of the phenolic novolak resin described in Example I is dissolved in 1200 ml. of isopropyl alcohol with warming. The resulting solution is cooled to room temperature and then 280 g. of isoamyl nitrite is added with stirring. The resulting solution is allowed to stand overnight, whereupon considerable darkening occurs and a precipitate separates. This precipitate is isolated by filtration and the filtrate is concentrated under vacuum. Addition of the concentrated filtrate to aqueous sodium hydroxide produces a green solution (the quinone monoxime corresponding to the nitrosophenol). This alkali solution is filtered and the filtrate is extracted with ether to remove non-oximated organics. The aqueous green alkali layer is separated and added with stirring to 500 ml. of cooled concentrated hydrochloric acid. A dark brown solid separates which is identical with the solid precipitate isolated by filtration of the initial reaction mixture, and it is combined therewith.

The combined solid polymeric products are dried, and after drying, 286 g. of the polymer containing recurring nitrosophenol polymer structural units linked by a methylene bridge is obtained.

*Example VII*

A solution is prepared by adding 126 g. of the product of Example VI to 100 ml. of methanol. Then a solution of 65 g. of hydroxylamine hydrochloride and 250 g. of sodium acetate (as the trihydrate) in 200 ml. of water is added to this methanol solution, with stirring. An additional liter of methanol is then added to the mixture and stirring is continued overnight. The product is a dark brown reaction mixture comprising a polymer containing recurring p-quinone dioxime units linked by an o-methylene bridge as described in Example III. It is isolated by concentrating the dark reaction mixture to about half its original volume and then adding this concentrate to 2 liters of water with stirring. The product precipitates as a brown polymer which, after separation by filtration and drying, weighs 112 g.

*Example VIII*

A basic solution is prepared by dissolving 30 g. of sodium methoxide in 500 ml. of methanol, and 120 g. of an o-methylene-p-quinone dioxime polymer prepared as described in Example VII is added to this basic solution with stirring. The resulting dark green solution is placed in an autoclave which is flushed with nitrogen and then pressurized with nitric oxide to about 100 p.s.i. As absorption occurs, further nitric oxide is supplied; after 15 minutes, a total of 130 p.s.i. of nitric oxide has been absorbed. Nitric oxide is then flushed from the autoclave and there is removed a reaction mixture comprising a polymer having recurring p-phenylene-N,N'-dinitroso-dihydroxylamine disodium salt units linked by an o-methylene bridge as described in Example III.

The polymer may be precipitated by addition of benzene to the reaction mixture.

*Example IX*

The solution of the N-nitrosohydroxylamine salt polymer prepared as described in Example VIII, obtained as the reaction mixture, is added to 500 ml. of concentrated hydrochloric acid. The reaction is exothermic and nitrogen oxides are evolved. The precipitate is separated and dried. There are thus obtained 104 g. of a polymer containing recurring p-dinitrosobenzene nuclei as described in Example V.

*Example X*

Adhesive formulations are prepared having the following compositions (parts by weight):

|  | A | B | C |
| --- | --- | --- | --- |
| Chlorinated rubber [1] | 70 | 70 | 70 |
| Brominated dichlorobutadiene polymer [2] | 22 | 22 | 22 |
| Zinc Oxide | 5 | 5 | 5 |
| Carbon Black | 10 | 10 | 10 |
| Xylene | 300 | 300 | 300 |
| Dinitrosobenzene | 5 |  |  |
| Nitrogen-containing polymer [3] |  |  | 5-15 |

[1] Natural rubber, chlorine content about 67% by weight.
[2] Poly-2,3-dichlorobutadiene-1,3 after-brominated to a bromine content of about 27 mol-percent Br.
[3] As provided by this invention.

The formulations identified as C include a number of different compositions, each containing the stated ingredients, wherein the stated "nitrogen-containing polymer" is either the quinone dioxime polymer prepared as described in Example VII or the polymer containing recurring dinitrosobenzene nuclei prepared as described in Example IX, and the amount of each of these is varied from 5 parts by weight to 15 parts by weight. It is found that each of these formulations produces substantially equivalent results, and accordingly the results are reported hereinafter in summary as for "Composition C."

Each of these formations is coated on a soft natural rubber stock, which is let stand until the solvent has evaporated, after which the coated base of the rubber stock is placed in contact with a steel plate, and the assembly is held at 150° C. Periodically the samples are removed and tested for completeness of bond formation. The composition identified as A, containing dinitrosobenzene, has formed a good bond after 5 minutes. The samples in which composition B has been used as an adhesive, which composition contains neither dinitrosobenzene nor a nitrogen-containing polymer as provided by the present invention, have not formed a bond after 5 or 10 minutes, but after 15 minutes have formed a good bond. The formulations identified as C, containing either a product prepared as described in Example VII or as described in Example IX hereinabove, exhibit bond formation in less than 10 minutes and have formed a good bond at the end of 10 minutes.

The samples held at temperature until a good bond has been formed are now subjected to a highly severe test for environmental resistance. A tab of the rubber stock which has been protected from contact with the metal is bent back and fastened to hold the rubber under stress, and the sample is cut to expose the metal. Then the samples are immersed in boiling water and held in boiling water for 2 hours. At the end of the 2 hours, the samples are removed and after cooling, the rubber is pulled from the metal, and the percent rubber retained on the metal is observed. To the extent that the rubber is retained on the metal, the adhesive bond is stronger than the rubber itself. The composition containing no nitrogen-containing compound, identified as B above, has a rubber retention of between 65 and 85%. The samples prepared from the adhesive identified as A above, however, have a rubber retention on metal of only 20 to 45%. Whereas the adhesives comprising dinitrosobenzene and halogenated elastomers of the nature stated above may normally exhibit a bond strength greater than that of the same elastomers without the dinitrosobenzene, in this severe environmental resistance test they are attacked and become significantly less strong. By contrast, the assemblies prepared using formulation C as the adhesive, employing either the dioximino quinone polymer of Example VII or the dinitrosobenzene polymer prepared as described in Example IX, have a rubber retention of 70–80% on the average.

While the invention has been described with reference to various particular preferred embodiments thereof it is to be appreciated that modifications and variations can be made within the scope of the appended claims.

What is claimed is:

1. A polymer characterized by from 2 to about 16 recurring benzene nuclei linked by a methylene bridge, said benzene nuclei so linked in said polymer having thereon a first substituent selected from the group consisting of =O, —OH, —NO, =NOH and

where M is a cation, the methylene bridge links being located in positions on said benzene nuclei, with respect to said first substituent, selected from the ortho and para positions, and benzene nuclei so linked in said polymer having thereon a second substituent selected from the group consisting of —NO, =NOH and

where M is a cation, in the remaining of said positions selected from the ortho and para positions.

2. The polymer of claim 1 wherein said first substituent is a hydroxyl group and wherein said second substituent is a nitroso group.

3. The polymer of claim 1 wherein said first and second substituents are each an =NOH group.

4. The polymer of claim 3 wherein said benzoquinone dioxime nuclei are of the formula

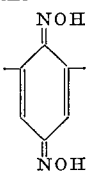

5. The polymer of claim 1 wherein said first and second substituents are each an

group.

6. The polymer of claim 5 wherein said benzene nuclei having thereon the substituents

are of the formula

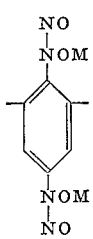

7. The polymer of claim 1 wherein said first and second substituents are each an —NO group.

8. The polymer of claim 7 wherein said benzene nuclei having the substituents —NO are of the formula

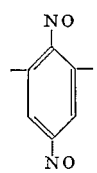

9. A novel method which comprises the steps of mixing a novolak resin, characterized by from 2 to about 16 recurring benzene nuclei linked by a methylene bridge, with at least one-fifth mole of a nitrite per mole of benzene nuclei in the novolak resin to form a nitrosophenol-containing polymer and mixing said nitrosophenol-containing polymer with at least approximately a molar equivalent of hydroxylamine per mole of nitrosophenol unit in the polymer to provide a quinonedioxime-containing polymer; mixing, in a substantially oxygen-free atmosphere, said quinonedioxime-containing polymer with at least about two equivalents of a base per mole of dioxime unit and with at least about two moles of nitric oxide per mole of dioxime unit; and finally mixing the resulting polymer with acid until evolution of oxides of nitrogen substantially ceases.

10. A novel method which comprises mixing a novolak resin, characterized by from 2 to about 16 recurring benzene nuclei linked by a methylene bridge, with at least one-fifth mole of a nitrite per mole of benzene nuclei in the novolak resin.

11. A novel method which comprises mixing the nitrosophenol-containing polymer of claim 2 with approximately a molar equivalent of hydroxylamine per mole of nitrosophenol unit in said polymer.

12. A novel method which comprises mixing, in a substantially oxygen-free atmosphere, the benzoquinonedioxime-containing polymer of claim 3 with at least about two equivalents of a base per mole of dioxime unit and with at least about two moles of nitric oxide per mole of dioxime unit.

13. A novel method which comprises mixing the polymer of claim 5 with an acid until evolution of nitric oxides substantially ceases.

References Cited by the Examiner

UNITED STATES PATENTS

| 2,443,678 | 6/1948 | Garvey | 260—3.5 |
| 2,838,463 | 6/1958 | Freeman | 260—3.5 |
| 2,937,159 | 5/1960 | McKay et al. | 260—59 |
| 3,005,798 | 10/1961 | Feigley | 260—59 |

OTHER REFERENCES

Walker, Formaldehyde, 2 ed. (1953), page 263.
Martin, Chemistry of Phenolic Resins (1956), page 87.
Martin, Chemistry of Phenolic Resins, 1956, pp. 222–223.

WILLIAM H. SHORT, *Primary Examiner.*

LEON J. BERCOVITZ, *Examiner.*

J. W. SANNER, V. MORGENSTERN, H. SCHAIN,
*Assistant Examiners.*